F. S. DICKINSON.
PNEUMATIC TIRE.
APPLICATION FILED FEB. 24, 1915. RENEWED AUG. 24, 1917.
1,294,427.
Patented Feb. 18, 1919.
2 SHEETS—SHEET 1.
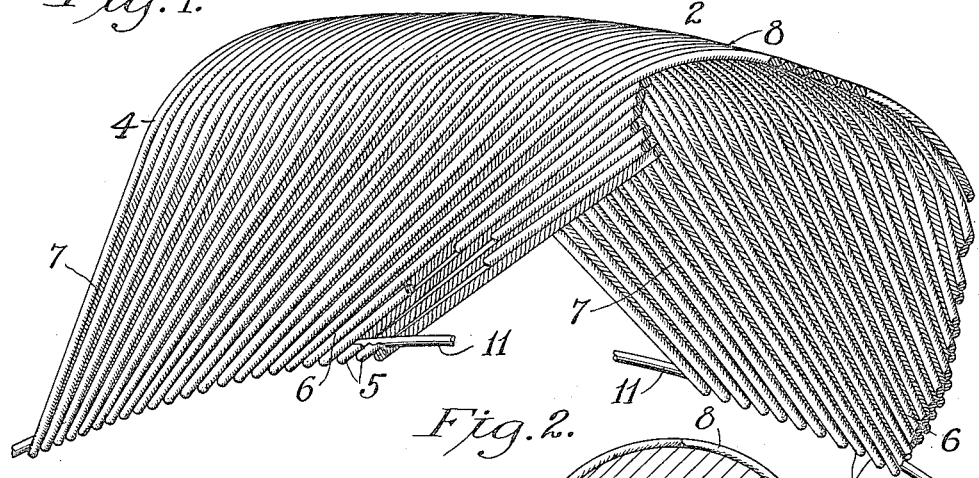
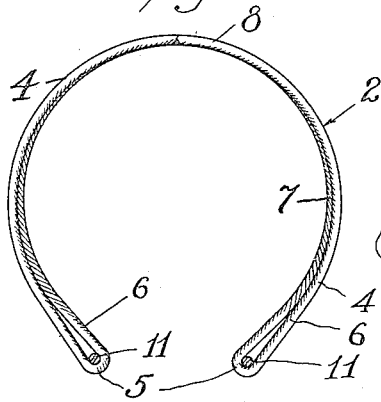 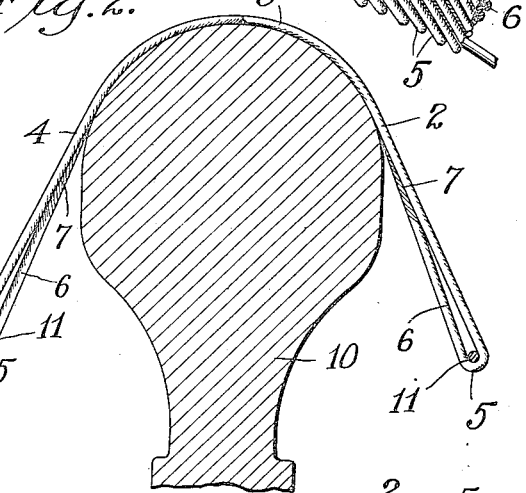
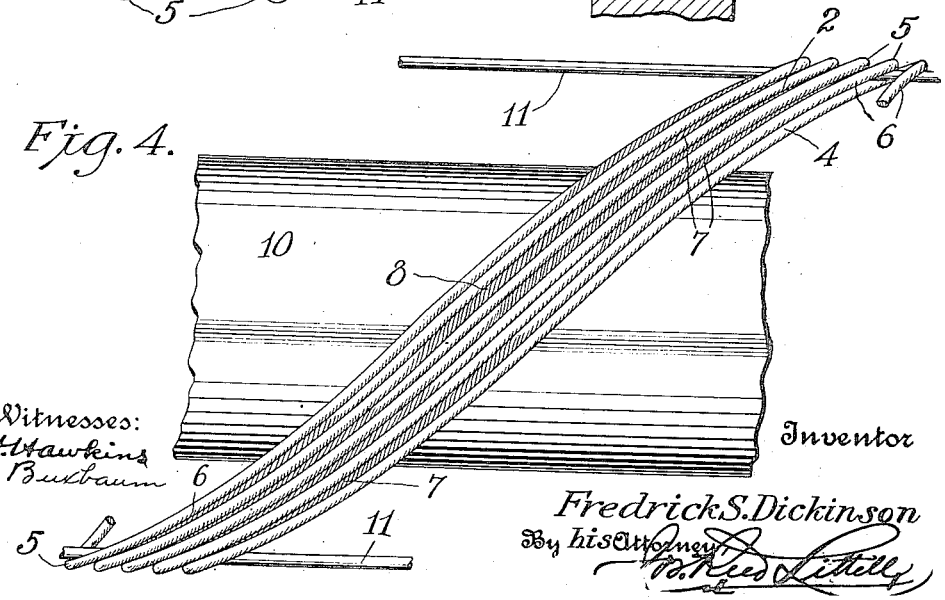
Witnesses:
W. H. Hawkins
Sol Buxbaum
Inventor
Fredrick S. Dickinson
By his Attorney F. S. DICKINSON.
PNEUMATIC TIRE.
APPLICATION FILED FEB. 24, 1915. RENEWED AUG. 24, 1917.
1,294,427.
Patented Feb. 18, 1919.
2 SHEETS—SHEET 2.
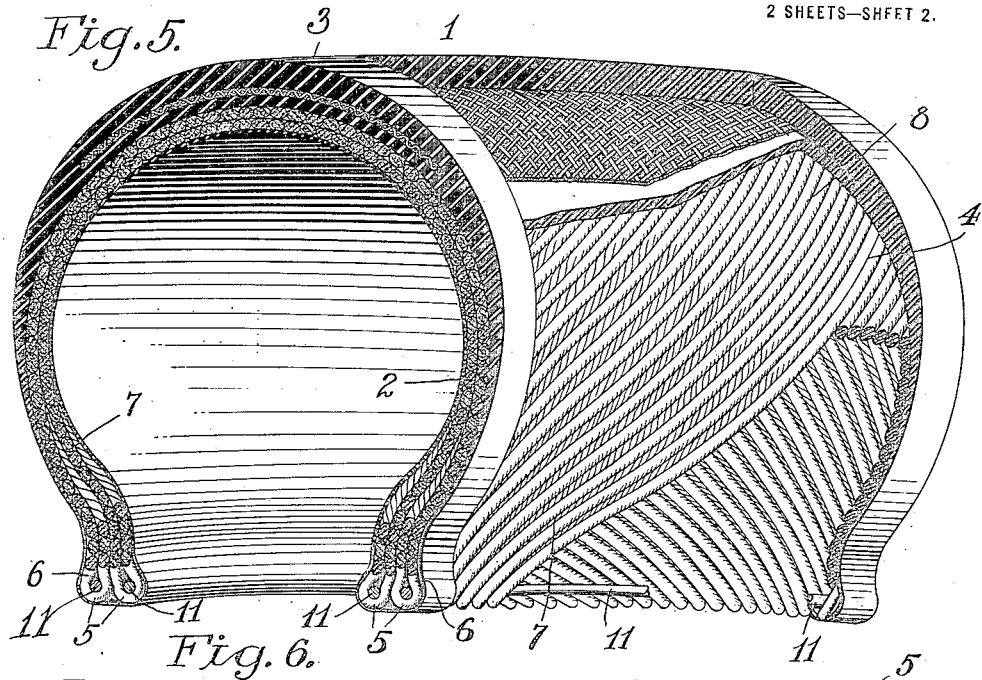
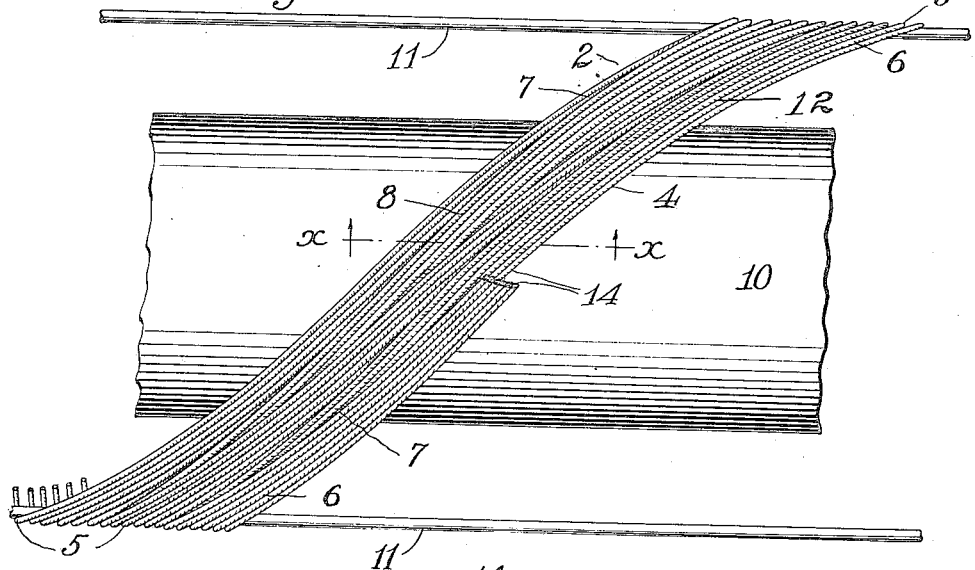
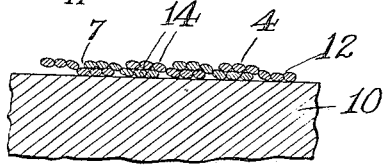
Witnesses:
W. H. Hawkins
Sol Buxbaum
Inventor
Fredrick S. Dickinson
By his Attorney

UNITED STATES PATENT OFFICE.

FREDRICK S. DICKINSON, OF NEW YORK, N. Y.

PNEUMATIC TIRE.

1,294,427. Specification of Letters Patent. Patented Feb. 18, 1919.

Application filed February 24, 1915, Serial No. 10,213. Renewed August 24, 1917. Serial No. 188,064.

*To all whom it may concern:*

Be it known that I, FREDRICK S. DICKINSON, a citizen of the United States, and resident of New York, in the county and State of New York, have invented certain new and useful Improvements in Pneumatic Tires, of which the following is a specification.

This invention relates to pneumatic tires such as are now commonly used upon automobiles and other vehicles and which comprise an elastic shoe or casing which constitutes the outer portion and tread of the tire and incloses the inner air tube and which has an internal textile body fabric or carcass.

My improvements have particular relation to that class of such tire shoes or casings in which the internal body fabric is of the "cord" type and made up of cords or threads laid to cover the circumferential area of the shoe or casing, in contradistinction to woven fabrics.

In the usual type of such cord or thread body fabrics for the shoes or casings of pneumatic tires, as now generally employed, the construction is such that the cords or threads are bunched, piled, crowded, packed and distorted at the portion of the body fabric which extends at the sides and rim edges of the shoe or casing, which conditions arise from the necessity of equalizing or compensating for the progressive variable difference in the circumference of the shoe or casing at all points of its area between the edge at the rim bead and the tread or periphery. The packing and distortion of the cords or threads, as just mentioned, to equalize or compensate for the differential circumference, not only fractures and weakens the fibers of which the cords or threads are composed but precludes that uniformity of tension which is requisite to durability in the life or service conditions of the tire.

Heretofore, in some types of so-called "cord" tires of the class to which my improvements relate, the differential circumference has been equalized or compensated for by flattening the cords or threads and laying up the narrow edges of the cords, which are thus produced, against or at right angles to the core or mandrel on which the cord fabric is formed, at that portion thereof which corresponds to the side edge or rim bead of the tire, from which point the flattened cords are gradually twisted until the wide or flat side thereof lays against or parallel to that portion of the core or mandrel which corresponds to the periphery or tread portion of the tire. While this construction compensates for the variable circumference, in that it serves to extend over or cover the full variable circumferential area of the tire shoe or casing, the flattening of the cords or threads fractures the fibers thereof and thereby materially weakens the fabric, and the twisting not only precludes the maintenance of uniformity of tension throughout the length of the cords or threads but it creates frictional action between the cords by displacing the position of the twist when the tire is depressed or flexed in service.

It is the object of my present invention to effectively overcome the conditions and objectionable features above set forth and produce an improved tire of the "cord" type in which the body fabric will retain all the initial strength of the fibers from which the cords or threads are made up and will insure the requisite uniformity of tension.

In the drawings—

Figure 1 is a perspective view, partly in section, of a single-ply construction of the cord body fabric embodying my invention.

Fig. 2 is a cross-section of the core or mandrel over which the cords or threads are laid in constructing the fabric, and illustrating the positional relationship of the cords thereto.

Fig. 3 is a detail cross-section illustrating the single-ply fabric in its contour as it would be in a finished tire under inflation.

Fig. 4 is a plan view illustrating the positional relationship of the cords or threads as laid over the core or mandrel on which the fabric is formed.

Fig. 5 is a perspective view, partly in section, illustrating a completed tire shoe or casing according to my invention and showing a construction thereof in which superimposed plies of the cord body fabric are employed.

Fig. 6 is a plan view corresponding to Fig. 4 and illustrating a modified construction according to my invention, in which a tape made up of a group of cords or threads is employed and laid in lieu of a single cord.

Fig. 7 is a detail cross-section on the line $x$—$x$, Fig. 6.

Corresponding parts in all the figures are denoted by the same reference characters.

Referring to the drawings, 1 designates the tire shoe or casing, which comprises the internal fabric body, 2, and the elastic external portion constituting the tread, 3, which casing incloses the usual air tube and is held in connection with the wheel rim in the usual manner.

The improved cord body fabric, as comprised in my invention, is constituted by the cords or threads, 4, which are laid to extend over or cover the entire circumferential area of the shoe or casing, the construction being preferably produced by the laying of a continuous length of cord or thread. Any suitable fiber material may be employed for the cords or threads, but they are preferably composed of non-extensible yarns, for instance, combed sea-island cotton spun and twisted in non-extensible yarns of suitable or adapted diameter.

In the construction of the improved body fabric, the cords or threads 4 are turned or looped, as at 5, at the terminal side edges or rim-bead portion of the tire, and at said loops they are laid directly over each other, as at 6, from which point they spread or diverge or radiate, in a gradual and continuous positional relationship, as at 7, at the circumferential side portions of the tire, so that they relatively spread and the under cord gradually emerges from beneath the upper cord, until they extend over or cover the full area of the greatest circumference of the tire at the tread or peripheral portion thereof, as at 8. The cord body fabric, under the improved construction above described, thus extends over or covers the full area of the varying or differential circumference of the tire shoe or casing, without packing or distortion or flattening or twisting of the cords or threads, and equalizes or compensates for the differential circumference at all points thereof. It will be noted that the laying up of the cords or threads is preferably such that they extend on a line diagonal or at an oblique angle to the transverse or segmental cross-sectional plane of the tire (see Fig. 4). In the construction employing single cords or threads, the gradually diverging or radiating cords have a position closely side by side at that portion of the fabric which is at the point of greatest circumference of the tire, which is where the cords cross the tread portion or periphery, as shown in Fig. 4.

In the practical construction of the improved cord body fabric, according to my invention, the cords are preferably laid over a suitable core or mandrel, 10, of such size and form as to conform to the inner contour of the finished tire shoe or casing, which core is suitably mounted rotatably to be advanced in step movements graduated according to the diameter of the cord or thread used. At opposite sides of said mandrel, are mounted rings or hoops, 11, which are initially held in position a suitable distance away from the core, as shown in Fig. 2, the relative position of said rings and core being such that the cords or threads when laid will have a proper length to extend over the periphery of the core and downwardly at each side thereof a sufficient distance to permit the rings 11 and the looped portions 5 of the cords to form the side edges or bead of the tire shoe or casing. The cords or threads are then laid in a continuous length passing under and around one of the side rings 11 and from thence over and across the periphery of the core 10 and under and around the other side ring 11, in the positional structural relationship of the completed cord fabric as hereinbefore described, the loops 5 being formed around the rings 11 and the gradual divergence or radiation of the cords being from this point over and across the periphery of the core, as at 7—8 (Fig. 4). The laying of the cords in the manner just indicated is continued until the fabric corresponding to the entire circumference of the tire shoe or casing is completed, after which the rings 11 are brought inwardly and set against the sides of the core and suitably clamped in this position in which the finished fabric will conform to the circumferential annular and segmental cross-sectional contour of the finished shoe or casing. If a plurality of plies are to be employed in the body fabric, as shown in Fig. 5, the succeeding plies are laid up in like manner as that just described, but preferably at an oblique angle or diagonal position opposite to that of the preceding ply. When the desired number of plies have been laid up in the foregoing manner, an elastic bond is created between all the cords or threads by the application of a caoutchouc filler, this being preferably accomplished by impregnating the entire body fabric with soluble rubber in a vacuum chamber. There is thus produced a homogeneous caoutchouc and fabric carcass conforming to the contour of the finished shoe or casing and comprising a casing of rubber in which are embedded reinforcing cords or threads. After completion of the homogeneous cord fabric and caoutchouc carcass or casing, as just described, the latter is placed in association with the elastic external portion of the shoe or casing, which incloses the body fabric or carcass and forms the usual cushion and tread 3 of the tire, and the complete shoe or casing thus produced is vulcanized or cured in the customary manner.

I do not restrict myself to any particular method or mechanism for laying up or forming the improved construction of the cord body fabric as comprised in my invention, as this may be accomplished in various ways. For instance, the cords or threads may be initially wound or looped over the two rings 11 with the latter positioned a proper distance apart to allow sufficient length of cord extending between them to form the width of body fabric which is to pass at the determined oblique angle from the edge or bead of one side of the tire to the edge or bead of the other side; then, into the annular completed ring or hoop of the cord fabric so formed upon the side rings 11, a sectional core or mandrel is inserted, with the periphery thereof midway between the two side rings 11, after which said side rings are relatively turned in opposite directions to lay the cords over the core at the proper oblique angle in the relative position as hereinbefore described and as shown in Fig. 4, in which the cords overlay each other at the side bends or loops 5 and gradually diverge or radiate therefrom so that the under cord emerges from beneath the upper cord, as at 7, until the cords lay parallel and side by side, as at 8, over the area of the peripheral portion of the core.

The rings 11, upon which the cords or threads are looped or wound, may be of any suitable material, such as a metallic wire or a textile cord, and they preferably remain within the completed fabric, so that they form beads or retaining rings within the selvage edge of the fabric at the loops 5 (Fig. 5), at the side edges or beads of the shoe or casing, by which the tire is held in position on the wheel rim.

Under some circumstances of tire construction, a single ply of the improved cord body fabric, as shown in Figs. 1 and 4, may be employed, but under some circumstances a plurality of layers or plies or laminations of the fabric are employed, as shown in Fig. 5, and where a plurality of plies are employed the respective plies preferably extend in opposite directions in their diagonal or oblique lines with relation to the segmental cross-section of the shoe or casing, which reverse positions of the plies are best adapted to equalize all stresses or strains when the tire is depressed or flexed in service.

Under some circumstances of construction, in lieu of laying a single cord or thread (as illustrated in Fig. 4), the improved cord body fabric may be laid from a tape made up of groups or multiples of single cords or threads, as in the modified construction illustrated in Figs. 6 and 7. The tape, shown at 12, in this construction, is laid in the same manner as the single cord or thread construction, with the side loops, 5, extending around the rings or hoops 11, at which point the tapes directly overlie each other and from which point the tapes gradually diverge or radiate, as at 7, so that the under tape gradually emerges from beneath the upper tape and the tapes overlie and extend over or cover, as at 8, the increased circumferential area of the peripheral or tread portion of the shoe or casing. In view of the increased width of the tape unit, in contradistinction to the single cord construction as shown in Fig. 4, it is not necessary that the tapes lay side by side at the peripheral or tread portion, as is the case with the single cord construction, but the tapes are laid to overlap a suitable portion of their respective widths, as shown at 14, at the peripheral or tread portion, which overlapping construction fully equalizes and compensates for the differential diameters in the same manner as the single cord construction and at the same time produces a double thickness of the cord body fabric at all points throughout its area (see Fig. 7), this construction being especially adapted for employment as a single ply fabric in that it affords substantially the same thickness and strength of a double ply fabric formed of the single cord construction.

I do not desire to be understood as limiting myself to the detail construction and arrangement of parts as herein shown and described, as it is manifest that variations and modifications therein may be resorted to, in the adaptation of my invention to varying conditions of use, without departing from the spirit and scope of my invention and improvements. I therefore reserve the right to all such variations and modifications as properly fall within the scope of my invention and the terms of the following claims.

Having thus described my invention, I claim and desire to secure by Letters Patent:

1. As a new article of manufacture, an internal body fabric for the shoe or casing of pneumatic tires of the "cord" type, having a continuous length of textile cord or thread turned or looped at an angle to the annulus of the tire and laid over itself at said turn or loop at the terminal side edges or rim-bead portion of the tire, and spread or diverged from said overlying looped side-edge portion in a gradual and continuous positional relationship at the circumferential side portions of the tire so that the under portion of the length of cord gradually emerges from beneath the upper portion thereof and said under and upper portions relatively spread and extend over the enlarged circumferential area to conjointly cover the space area of the greatest circumference of the tire at the tread or peripheral portion thereof, whereby the continuous length of the cord body fabric will itself equalize or compensate for the progressive variable circumference of the tire without distortion or flattening or twisting of the length of textile cord.

2. As a new article of manufacture, an internal body fabric for the shoe or casing of pneumatic tires of the "cord" type, having a continuous length of textile cord or thread looped at an angle to the annulus of the tire at the terminal side edges thereof and spread or diverged from said looped side-edge portion in a gradual positional relationship at the circumferential side portions of the tire so that the portions of the length of cord extending from said loop relatively spread and extend over the enlarged circumferential area to conjointly cover the space area of the greatest circumference of the tire at the tread or peripheral portion thereof, whereby the continuous length of the cord body fabric will itself equalize or compensate for the progressive variable circumference of the tire without distortion or flattening or twisting of the length of textile cord.

3. As a new article of manufacture, an internal body fabric for the shoe or casing of pneumatic tires of the "cord" type, having a continuous length of textile cord or thread relatively spread or diverged from a terminal point at the side-edge portion of the tire in a gradual and continuous positional relationship at the circumferential side portions of the tire and laid side by side in abutting position at the peripheral or tread portion thereof so that the divergent portions of said length of cord relatively spread and extend over the enlarged circumferential area to conjointly and entirely cover the space area of the greatest circumference of the tire at the tread or peripheral portion thereof without distortion or flattening or twisting of the length of textile cord.

4. As a new article of manufacture, an internal body fabric for the shoe or casing of pneumatic tires of the "cord" type, having a plurality of layers or plies respectively comprising a continuous length of textile cord or thread turned or looped at an angle to the annulus of the tire at the terminal side edges or rim-bead portion thereof and from said loop relatively spread or diverged at the circumferential side portions of the tire to the tread or peripheral portion thereof in a gradual and continuous positional relationship so that in each respective layer the divergent portions of the length of cord relatively spread and extend over the enlarged circumferential area to conjointly and entirely cover the space area of the progressive variable circumference of the tire without distortion or flattening or twisting of the length of the textile cord.

5. An elastic tire, comprising an inner layer composed of a cord disposed in successive convolutions which extend in parallelism obliquely across the tread with all parts of the tread-forming portions of said cord lying in a lateral contact, the lateral ends of said convolutions formed into loops or bights, said loops disposed in planes transverse to the tire with the axes of said loops in circumferential alinement, one member of each convolution arranged to overlap its complemental member along the side portions of said tire, and with the balance of the members of all convolutions lying in snug contact at the tread of the tire, a circumferential anchor extending through said loops, a second layer superposed on said first layer and composed of a cord disposed in successive convolutions with the convolutions disposed in parallelism and obliquely across the tread and at approximately right angles with respect to the convolutions of the first layer, the convolutions of the second layer forming loops or bights at the lateral portions of the tire and disposed in planes transverse to the tire and with all the tread-forming portions of the convolutions of the second layer in snug contact at the tread, and a circumferential anchor extending through the loops or bights of the second layer and arranged in approximate parallelism with the first anchor.

In witness whereof I have signed my name in the presence of the subscribing witnesses.

FREDRICK S. DICKINSON.

Witnesses:
 Jos. Reed Littell,
 Agnes Lee.